United States Patent
Takeuchi

(10) Patent No.: US 6,750,665 B2
(45) Date of Patent: Jun. 15, 2004

(54) SEMICONDUCTOR PRESSURE DETECTING DEVICE

(75) Inventor: Takanobu Takeuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/137,409

(22) Filed: May 3, 2002

(65) Prior Publication Data

US 2003/0080760 A1 May 1, 2003

(30) Foreign Application Priority Data

Oct. 30, 2001 (JP) ........................ 2001-332296

(51) Int. Cl.[7] .................. G01R 27/10; G01R 29/26
(52) U.S. Cl. .................... 324/725; 324/713
(58) Field of Search .................. 324/713, 719, 324/721, 720, 725; 73/754

(56) References Cited

U.S. PATENT DOCUMENTS 6,198,296 B1 * 3/2001 Ivanov ................ 324/725

* cited by examiner

Primary Examiner—Albert Decady
Assistant Examiner—James C. Kerveros
(74) Attorney, Agent, or Firm—Oblon, Spivak, McClelland, Maier & Neustadt, P.C.

(57) ABSTRACT

The voltage corresponding to the pressure outputted from a Wheatstone bridge having resistors R1 to R4 is amplified by a differential amplifier 3 and operational amplifiers OP1, OP2, and then outputted through an output terminal 4 to an external device as the output voltage VOUT. The offset voltage ZSOUT is outputted from the operational amplifier OP10. The output voltage VOUT and the offset voltage ZSOUT are fed back to the reference source voltage Vsen by operational amplifiers OP3 to OP5. In consequence, a non-linear output property of output-attenuating or output-increasing type can be easily obtained, while errors due to the offset voltage ZSOUT can be diminished.

7 Claims, 5 Drawing Sheets

SEMICONDUCTOR PRESSURE DETECTING DEVICE

This application is based on the application No. 2001-332296 filed in Japan, the contents of which are hereby incorporated by reference.

BACKGROUND OF THE INVENTION

1. Field of the Invention

The present invention relates to a semiconductor pressure detecting device whose output voltage is non-linearly changed for the pressure change.

2. Description of the Prior Art

A semiconductor pressure detecting device, which transforms the distortion or the resistance change generated in a piezo resistance or the like in response to pressure into voltage to detect the pressure on the basis of the voltage, has been widely used in various fields, because it is very small sized, has a high precision in measurement and can be easily mass-produced (For example, see Japanese Laid-open Patent Publications No. 55-37906, No. 63-241439 and No. 9-61189.).

FIG. 5 is a circuit diagram showing an electrical construction of a conventional representative semiconductor pressure detecting device of the above-mentioned type. As shown in FIG. 5, the conventional semiconductor pressure detecting device 101 is provided with a sensor element section 102 having a Wheatstone bridge composed of four resistors R101 to R104 each of which is formed of a piezo resistance or the like, a differential amplifier 103 which amplifies the voltage outputted from the sensor element section 102, two operational amplifiers OP101, OP102 each of which amplifies the voltage outputted from the differential amplifier 103, and an output terminal 104 for outputting the amplified voltage.

In addition, the semiconductor pressure detecting device 101 is provided with another operational amplifier OP121 for generating reference voltage Vref for the differential amplifier 103 and operational amplifiers OP101, OP102, using driving voltage Vcc supplied from an external section. Hereupon, two resistors R111 and R112 are appended to the operational amplifier OP101 while four resistors R121 to R124 are appended to the operational amplifier OP102. Meanwhile, two resistors R105 and R106 are appended to the operational amplifier OP121.

Thus, in the conventional semiconductor pressure detecting device 101, the voltage corresponding to the pressure, which is outputted from the sensor element section 102, is amplified by the differential amplifier 103 and the operational amplifiers OP101, OP102, and then outputted from the output terminal 104 as the output voltage VOUT.

The conventional semiconductor pressure detecting device, for example shown in FIG. 5, has such an output property that the output voltage is linearly changed for the pressure change. In consequence, for example, in such a case that high precision is required in the low pressure region while high precision is not required so much in the high pressure region, the semiconductor pressure detecting device must have a design specification suitable for the precision in the low pressure region. On the other hand, if there exists a requirement contrary to the above-mentioned example, the semiconductor pressure detecting device must have a design specification suitable for the precision in the high pressure region. Therefore, there exists such a problem that the semiconductor pressure detecting device becomes expensive because it must be designed one by one for each of various specifications.

Meanwhile, in the conventional semiconductor pressure detecting device, the output voltage is generally inputted into an A-D converter in a micro computer or the like. In consequence, the semiconductor pressure detecting device is designed so as to have such an output property that the output is proportional to the change of the source voltage or the driving voltage (i.e. "source voltage ratio property"). On the other hand, the A-D converter also has an operating property proportional to the change of the source voltage. Therefore, if a common source is used for the both, there may be obtained such an advantage that errors of the both due to the change of the source voltage are canceled to each other. However, in that case, because the source voltage ratio property can not be obtained when it is constructed as a non-linear circuit, there may occur such a problem that the errors in measurement become larger.

Moreover, in the conventional semiconductor pressure detecting device, if it is constructed as a non-linear circuit, there may occur such a problem that errors occur due to the offset voltage (i.e. output voltage when the pressure is 0) when the output voltage is fed back. For example, the output voltage is required to have a non-liner property which merely corresponds to the pressure change only. However, when the offset voltage of the semiconductor pressure detecting device is not 0V, there may occur such a problem that a non-linear correction is performed due to the offset voltage even if the pressure change is 0.

Further, in the conventional semiconductor pressure detecting device, because the non-linear property can not be adjusted, there may occur such a problem that errors occur due to dispersion among the products such as the non-linearity of the sensor element (due to the balloon effect etc.) or the non-linearity of the IC circuit (for example, due to the voltage dependency of the resistor).

SUMMARY OF THE INVENTION

The present invention, which has been developed to solve the conventional problems described above, has an object to provide a semiconductor pressure detecting device having the following features. That is, a non-linear output property can be obtained. A source voltage ratio property can be obtained. Errors due to the offset voltage can be diminished. In addition, the non-linear property can be easily adjusted.

A semiconductor pressure detecting device according to the present invention, which has been developed to solve the above-mentioned problems, includes a sensor element section, a voltage amplifying section and an output voltage feedback section. The sensor element section has semiconductor resistors (for example, piezo resistors), each of which is distorted in response to pressure to change its resistance in response to a distortion thereof. The sensor element section is supplied with a reference source voltage Vsen while outputting a voltage corresponding to the pressure. The voltage amplifying section amplifies the voltage outputted from the sensor element section to output the amplified voltage as an output voltage VOUT. The output voltage feedback section feeds back the output voltage VOUT of the voltage amplifying section to the reference source voltage Vsen so as to impart a non-linear property for the pressure to the output voltage.

According to the semiconductor pressure detecting device, a non-linear output property of output-attenuating type or output-increasing type can be easily obtained because the non-linear property for the pressure is imparted to the output voltage by feeding back the output voltage of the voltage amplifying section to the reference source voltage.

In each of the above-mentioned semiconductor pressure detecting devices, it is preferable that the feedback ratio of the output voltage VOUT of the voltage amplifying section for the reference source voltage Vsen can be set to an arbitrary value. In this case, the non-linear property of the device can be easily adjusted.

In each of the above-mentioned semiconductor pressure detecting devices, the output voltage feedback section may impart the output voltage VOUT with such a non-linear property that the higher the output voltage VOUT of the voltage amplifying section becomes, the higher the reference source voltage Vsen becomes. In this case, there may be obtained such a non-linear output property of output-increasing type that the sensitivity of the device is raised in the high pressure region while the sensitivity is lowered in the low pressure region.

Alternatively, the output voltage feedback section may impart the output voltage VOUT with such a non-linear property that the higher the output voltage VOUT of the voltage amplifying section becomes, the lower the reference source voltage Vsen becomes. In this case, there may be obtained such a non-linear output property of output-attenuating type that the sensitivity of the device is raised in the low pressure region while the sensitivity is lowered in the high pressure region.

BRIEF DESCRIPTION OF THE DRAWINGS

Various characteristics and advantages of the present invention will become clear from the following description taken in conjunction with the preferred embodiments with reference to the accompanying drawings throughout which like parts are designated by like reference numerals, in which.

DETAILED DESCRIPTION OF THE PREFERRED EMBODIMENTS (Embodiment 1)

Hereinafter, Embodiment 1 of the present invention will be concretely described. At first, the outline of the semiconductor pressure detecting device according to Embodiment 1 will be described.

Figure 1:
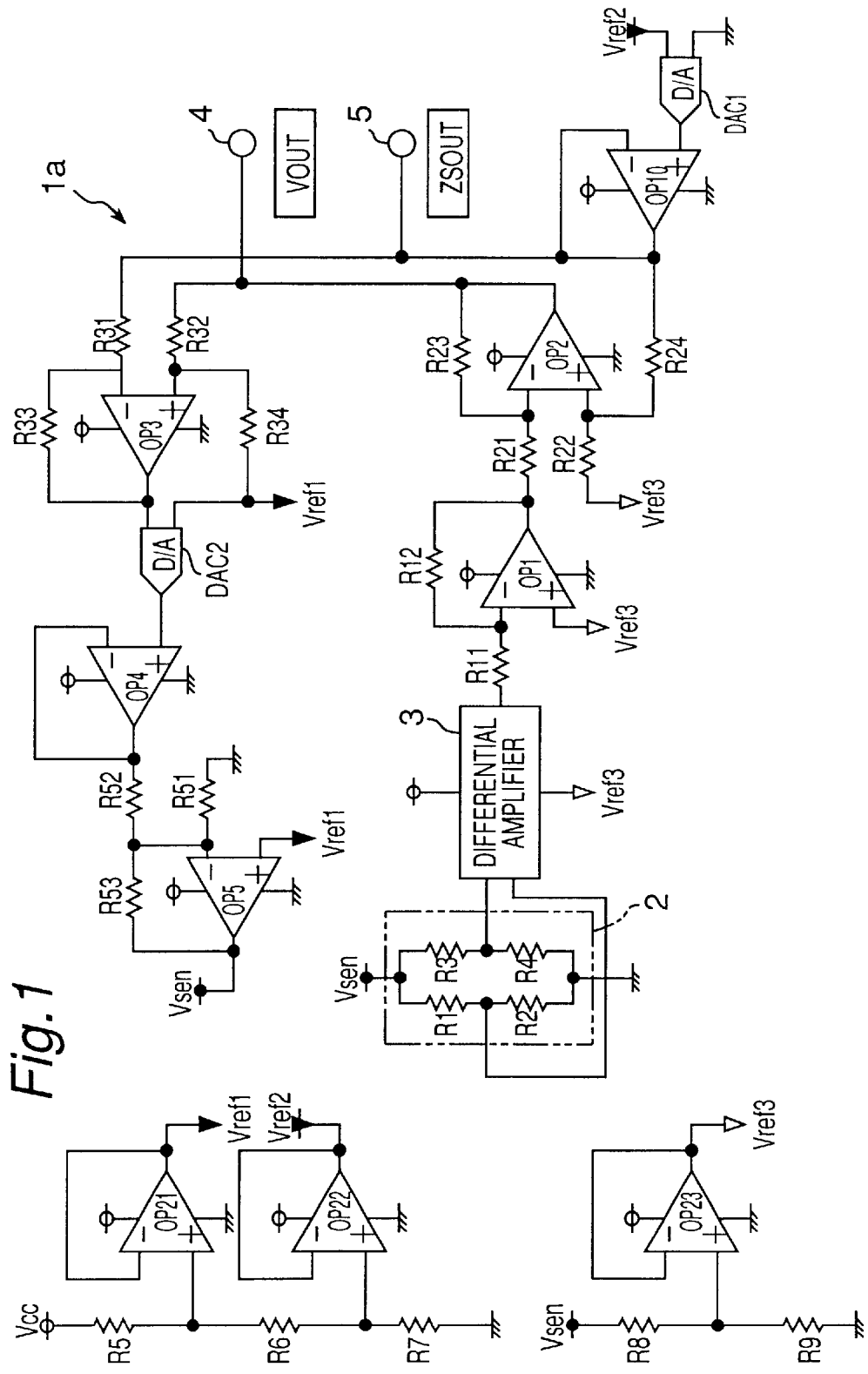
FIG. 1 is a circuit diagram showing the electrical construction of a semiconductor pressure detecting device according to Embodiment 1 of the present invention.

As shown in FIG. 1, the semiconductor pressure detecting device 1a includes a sensor element section 2, a voltage amplifying section, an offset voltage outputting section, an output voltage feedback section, a first reference voltage outputting section and a second reference voltage outputting section. The sensor element section 2 is provided with four resistors R1 to R4 (semiconductor resistors) forming a Wheatstone bridge structure. The voltage amplifying section is provided with a differential amplifier 3, two operational amplifiers OP1, OP2 and an amplified voltage output terminal 4. The offset voltage outputting section is provided with an operational amplifier OP10, a D-A converter DAC1 and an offset voltage output terminal 5. The output voltage feedback section is provided with three operational amplifiers OP3 to OP5 and a D-A converter DAC2. The first reference voltage outputting section is provided with two operational amplifiers OP21 and OP22. The second reference voltage outputting section is provided with an operational amplifier OP23.

The sensor element section 2 is supplied with reference source voltage Vsen. Further, in the sensor element section 2, each of the resistors R1 to R4 forming the Wheatstone bridge structure is distorted in response to the pressure to change its resistance value in response to the distortion. In consequence, voltage corresponding to the pressure is outputted from the sensor element section 2.

The voltage amplifying section amplifies the voltage outputted from the sensor element section 2 to produce a output voltage VOUT. Then, the voltage amplifying section outputs the output voltage VOUT to an external device (for example, microcomputer) through the amplified voltage output terminal 4, as well as to the output voltage feedback section. The voltage Vref3, which is proportional to the reference source voltage Vsen, is supplied as the reference voltage to the differential amplifier 3 and to the non-reversal input terminals (i.e. positive input terminals) of the operational amplifiers OP1, OP2, the voltage Vref3 having been outputted from the second reference voltage outputting section. Hereupon, two resistors R11 and R12 are appended to the operational amplifier OP1 while four resistors R21 to R24 are appended to the operational amplifier OP2.

The offset voltage outputting section outputs the offset voltage ZSOUT, that is the output voltage VOUT when the pressure is 0, to the external device through the offset voltage output terminal 5, as well as to the output voltage feedback section. The voltage Vref2 (ratio voltage), which is proportional to the driving voltage Vcc, is supplied as the reference voltage to the operational amplifier OP10, the voltage Vref2 having been outputted from the first reference voltage outputting section.

The output voltage feedback section imparts a non-linear property for the pressure to the output voltage VOUT by feeding back the difference voltage between the output voltage VOUT and the offset voltage ZSOUT to the reference source voltage Vsen. The voltage Vref1 (ratio voltage), which is proportional to the driving voltage Vcc supplied from an external section, is supplied as the reference voltage to the non-reversal input terminals of the operational amplifiers OP3, OP5, the voltage Vref1 having been outputted from the first reference voltage outputting section. Hereupon, four resistors R31 to R34 are appended to the operational amplifier OP3 while three resistors R51 to R53 are appended to the operational amplifier OP5.

In the first reference voltage outputting section, the operational amplifier OP21 outputs the reference voltage Vref1 which is proportional to the driving voltage Vcc, while the operational amplifier OP22 outputs the reference voltage Vref2 which is proportional to the driving voltage Vcc. In the second reference voltage outputting section, the operational amplifier OP23 outputs the reference voltage Vref3 which is proportional to the reference source voltage Vsen.

Next, the construction and the function of the semiconductor pressure detecting device 1a will be described more concretely. In the sensor element section 2, the four resistors R1 to R4 forming the Wheatstone bridge construction are formed in a semiconductor chip, each of the resistors being composed of a diffused resistor in which impurities have been diffused in a semiconductor material (for example, silicon). When pressure is applied to the sensor element section 2, the Wheatstone bridge becomes ill-balanced to produce voltage Δ V. The voltage Δ V is outputted from the sensor element section 2 to the differential amplifier 3. The outputted voltage Δ V is proportional to the pressure.

The voltage Δ V outputted from the sensor element section 2 is amplified by the differential amplifier 3, further amplified by the operational amplifiers OP1, OP2, and then outputted as the output voltage VOUT. The reference voltage Vref3 for each of the differential amplifier 3 and the operational amplifiers OP1, OP2 is supplied from the operational amplifier OP23 in the second reference voltage outputting section. Hereupon, the reference source voltage Vsen, which is supplied to the sensor element section 2 as the source voltage, is also used as the source voltage of the second reference voltage outputting section. That is, the source voltage is common to the second reference voltage outputting section and the sensor element section 2. The operational amplifier OP1 performs reversal amplification whose amplifying ratio is defined as (resistance of R12)/(resistance of R11). Because the detailed circuit construction of the inside portion of the operational amplifier OP1 is generally well known, the description about it is omitted (as to other operational amplifiers also).

The resistance of each of the four resistors R21 to R24 appended to the operational amplifier OP2 is set to such a specification that the ratio of (resistance of R23)/(resistance of R21) is equal to the ratio of (resistance of R24)/(resistance of R22). The operational amplifier OP2 is designed so as to have such a property that the output voltage of the operational amplifier OP1 is equal to the reference voltage Vref3 when the applied pressure is 0. In consequence, when the applied pressure is 0, the output voltage of the operational amplifier OP10 whose output terminal is connected to the resistor R24, becomes identical to the output voltage of the operational amplifier OP2. Accordingly, by adjusting the output voltage of the operational amplifier OP10, the output voltage VOUT when the pressure applied to the semiconductor pressure detecting device 1a is 0, namely the offset voltage ZSOUT, can be adjusted.

Therefore, if the overall circuit amplification ratio of the differential amplifier 3 and the operational amplifiers OP1, OP2 is denoted by the symbol of Av, the output voltage of the operational amplifier OP2 during the offset period and pressure-applied period are expressed by the following equations Eq1 and Eq2, respectively. In the equation Eq2, Δ V means the output voltage of the sensor element section 2.
(Offset Period)

$$\text{Output voltage of OP2} = \text{Output voltage of OP10} \quad \text{Eq1}$$

(Pressure-applied Period)

$$\text{Output voltage of OP2} = \text{Output voltage of OP10} + \Delta V \cdot Av \quad \text{Eq2}$$

The output voltage VOUT from the operational amplifier OP2 is outputted to the external device such as a microcomputer through the amplified voltage output terminal 4, and also to the non-reversal input terminal of the operational amplifier OP3 composing the output voltage feedback section through the resistor R32. On the other hand, into the reversal input terminal (i.e. negative input terminal) of the operational amplifier OP3, the output voltage of the operational amplifier OP10, namely the offset voltage ZSOUT is inputted.

The resistance of each of the four resistors R31 to R34 appended to the operational amplifier OP3 is set to such a specification that the ratio of (resistance of R33)/(resistance of R31) is equal to the ratio of (resistance of R34)/(resistance of R32). In consequence, the operational amplifier OP3 performs differential amplification for the output voltage VOUT of the operational amplifier OP2 and the output voltage ZSOUT of the operational amplifier OP10. That is, as apparent from the equations Eq1 and Eq2, the operational amplifier OP3 amplifies the voltage by the value of ΔV·Av (i.e. the change of the output voltage due to the applied pressure). Hereupon, the amplification ratio of the operational amplifier OP3 is defined as (resistance of R33)/(resistance of R31).

The reference voltage Vref1 is supplied to one of the input terminals of the D-A converter DAC2, the input terminal being connected to one end portion of the resistor R34 also. Accordingly, the input terminal has a fixed electric potential. On the other hand, the other input terminal of the D-A converter DAC2 is connected to the output terminal of the operational amplifier OP3. Hereupon, if the output voltage VOUT is raised, the output voltage of the operational amplifier OP3 is also raised.

The D-A converter DAC2 takes out an arbitrarily divided electric potential from the voltage difference between the both input terminals, and then outputs it. The output of the D-A converter DAC2 is inputted into the reversal input terminal of the operational amplifier OP5 through the operational amplifier OP4 which acts as a buffer amplifier. On the other hand, the reference voltage Vref1 is supplied to the non-reversal input terminal of the operational amplifier OP5. That is, in the operational amplifier OP5, the output voltage of the D-A converter DAC 2 or the operational amplifier OP4 is added to the reference voltage Vref1. The operational amplifier OP5 is a reversal amplifier. Thus, when the output voltage VOUT is raised, the output voltage of the operational amplifier OP3 is raised so that the output voltage of the operational amplifier OP4 which acts as the buffer amplifier is also raised. To the contrary, the output voltage of the operational amplifier OP5 is lowered when the output voltage VOUT is raised.

Thus, the output voltage of the operational amplifier OP5 becomes the reference source voltage Vsen which is to be supplied to the sensor element section 2 and the second reference voltage outputting section (operational amplifier OP23). That is, the output voltage VOUT is fed back to the reference source voltage Vsen of the sensor element section 2. Hereupon, the output voltage ΔV of the sensor element section 2 is raised in proportion to the pressure if the reference source voltage Vsen is constant.

However, in the semiconductor pressure detecting device 1a according to Embodiment 1, the output voltage VOUT is fed back to the reference source voltage Vsen of the sensor element section 2. In consequence, with the increase of the output voltage ΔV of the sensor element section 2, the reference source voltage Vsen (supplied source voltage) is lowered due to the feedback of a portion of the output voltage VOUT. Accordingly, in the semiconductor pressure detecting device 1a, there is obtained such a non-linear property that the sensitivity is lowered with the increase of the output. That is, there is obtained such a non-linear property of output-attenuating type that the sensitivity is raised in the low pressure region while the sensitivity is lowered in the high pressure region.

As described above, the reference voltage Vref3, which is based on the reference source voltage Vsen having the non-liner property, is used for the differential amplifier 3 and the operational amplifiers OP1, OP2, each of which transmits the above-mentioned non-linear signal. In consequence, each of the differential amplifier 3 and the operational amplifiers OP1, OP2 can have an output property which is proportional to the reference source voltage Vsen. In addition, because the reference source voltage Vsen is produced by adding the output voltage of the D-A converter DAC2 or the operational amplifier OP4 to the reference voltage Vref1 based on the driving voltage Vcc, it can have an output property which is proportional to the change of the driving voltage Vcc. That is, the output voltage can have a source voltage ratio property (i.e. source voltage ratio metric property).

Because $\Delta V \cdot Av$ (i.e. the change of the output voltage due to the applied pressure) is amplified in the semiconductor pressure detecting device 1a according to Embodiment 1 (see equations Eq1 and Eq2) as described above, the influence (i.e. error) of the offset voltage ZSOUT can diminished when the output voltage VOUT is fed back to the reference source voltage Vsen. Further, because the feedback ratio can be adjusted, it may be possible to respond to changes of the specification by using only one kind of semiconductor pressure detecting device.

Figure 2:
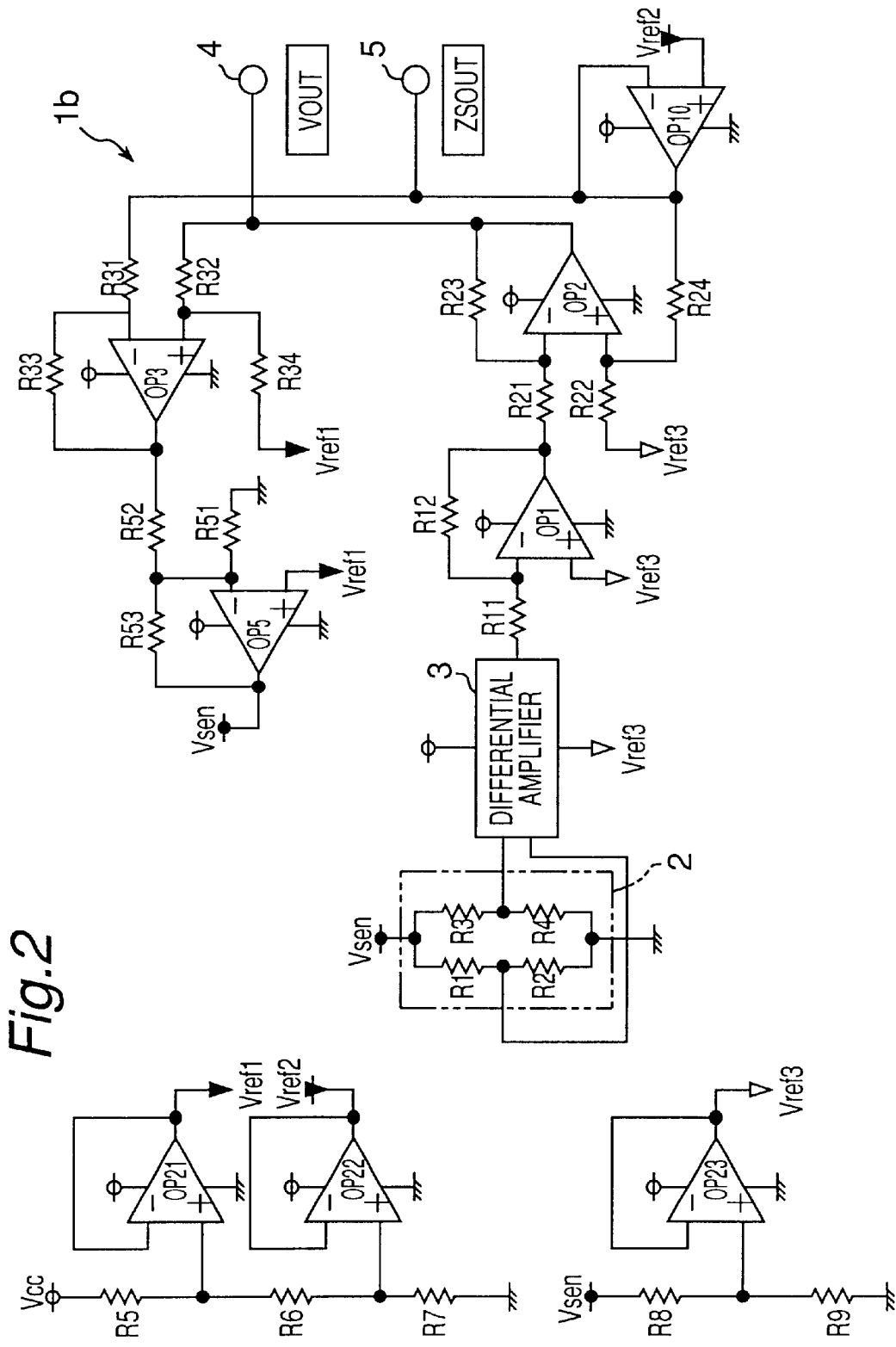
FIG. 2 is a circuit diagram showing the electrical construction of a semiconductor pressure detecting device without the D-A converter, the device being a variation of the semiconductor pressure detecting device shown in FIG. 1.

FIG. 2 is a circuit diagram showing the electrical construction of a semiconductor pressure detecting device according to a variation of Embodiment 1. As shown in FIG. 2, the semiconductor pressure detecting device 1b according to the variation is identical to such one that the operational amplifier OP4 and the two D-A converters DAC1, DAC2 are eliminated from the semiconductor pressure detecting device 1a shown in FIG. 1. The semiconductor pressure detecting device 1b cannot have the function to adjust its property because it does not have the D-A converters DAC1 and DAC2. However, with exception of the above-mentioned adjustable function, the semiconductor pressure detecting device 1b has the functions as same as those of the semiconductor pressure detecting device 1a.

Figure 3:
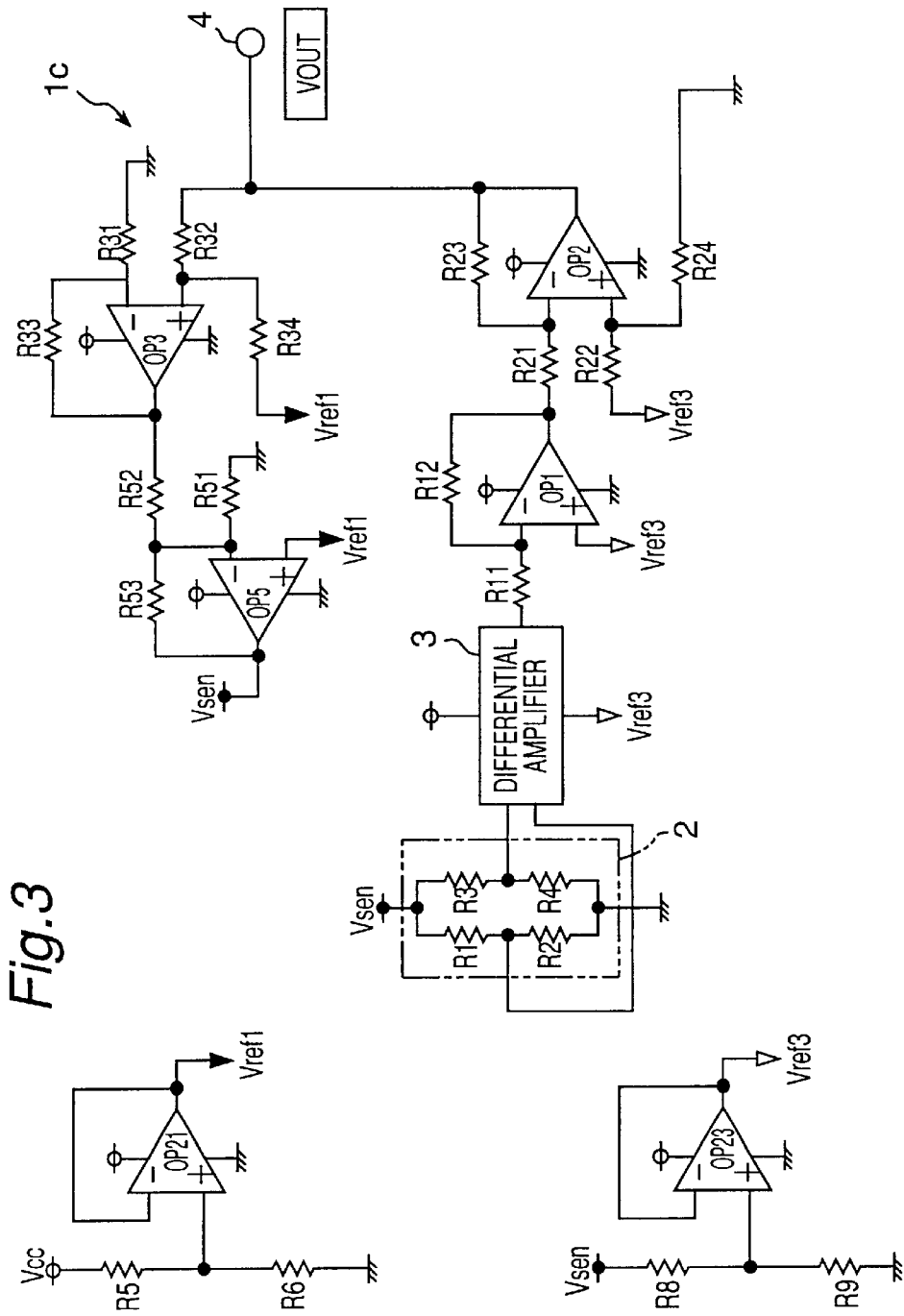
FIG. 3 is a circuit diagram showing the electrical construction of a semiconductor pressure detecting device in which the offset voltage is fixed to 0V, the device being another variation of the semiconductor pressure detecting device shown in FIG. 1.

FIG. 3 is a circuit diagram showing the electrical construction of a semiconductor pressure detecting device according to another variation of Embodiment 1. As shown in FIG. 3, the semiconductor pressure detecting device 1c according to the variation is identical to such one that the three operational amplifiers OP4, OP10, OP22, the two D-A converters DAC1, DAC2, the offset voltage output terminal 5 and the resistor R7 are eliminated from the semiconductor pressure detecting device 1a shown in FIG. 1.

Because the semiconductor pressure detecting device 1c is not provided with the offset voltage outputting section (i.e. operational amplifier OP1, D-A converter DAC1, offset voltage output terminal 5), the offset voltage is fixed to 0V so that the influence (i.e. error) of the offset voltage cannot be diminished. In addition, the semiconductor pressure detecting device 1c can not have the function to adjust its property because it does not have the D-A converter DAC2. However, with exception of those, the semiconductor pressure detecting device 1c has the functions as same as those of the semiconductor pressure detecting device 1a.

(Embodiment 2)

Hereinafter, Embodiment 2 of the present invention will be described with reference to FIG. 4. However, the fundamental construction of the semiconductor pressure detecting device according to Embodiment 2 is common with that of the semiconductor pressure detecting device according to Embodiment 1. Therefore, in order to avoid duplicate descriptions, differences between Embodiments 1 and 2 will be mainly described hereinafter while omitting descriptions about the members common with those of Embodiment 1, the common members having the same reference numerals to each other.

Figure 4:
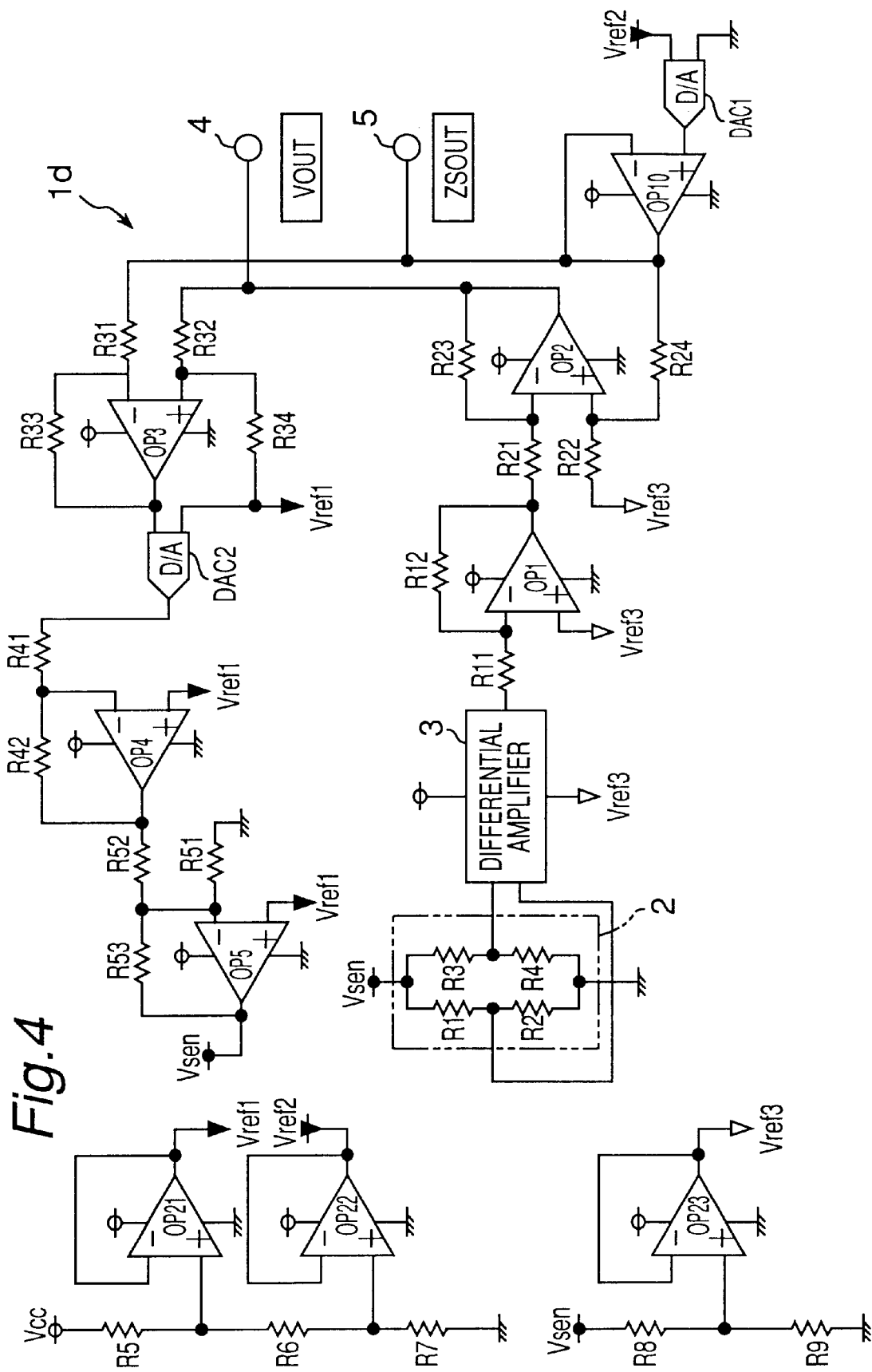
FIG. 4 is a circuit diagram showing the electrical construction of a semiconductor pressure detecting device according to Embodiment 2 of the present invention.
Figure 5:
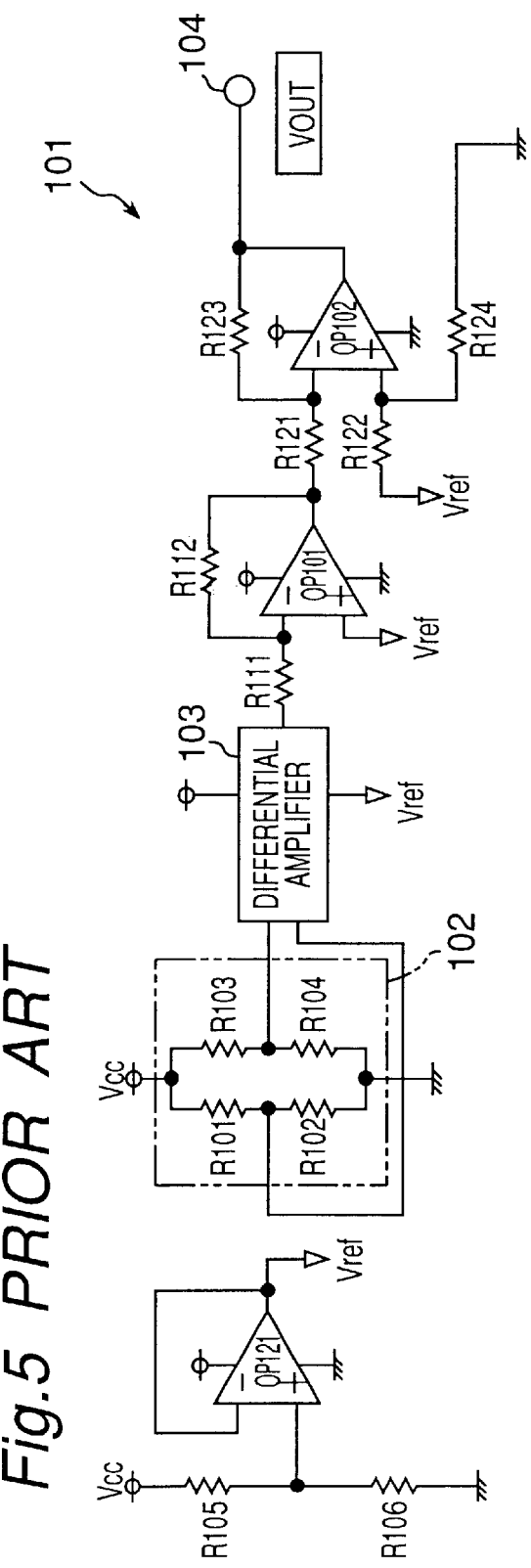
FIG. 5 is a circuit diagram showing the electrical construction of a conventional semiconductor pressure detecting device.

As shown in FIG. 4, in the semiconductor pressure detecting device 1d according to Embodiment 2, the operational amplifier OP4 is not a buffer amplifier, but a reversal amplification circuit, to which resistors R41 and R42 are appended and to which the reference voltage Vref1 is supplied. Hereupon, the output voltage of the D-A converter DAC2 is inputted into the reversal input terminal of the operational amplifier OP4 while the reference voltage Vref1 is inputted into the non-reversal input terminal. Other constructions are as same as those of Embodiment 1.

Because the operational amplifier OP4 is a reversal amplification circuit in the semiconductor pressure detecting device 1d according to Embodiment 2, the higher the output voltage VOUT becomes, the higher the electric potential of the reference source voltage Vsen becomes. That is, the semiconductor pressure detecting device 1d has such a non-linear output property of output-increasing type that the sensitivity is raised in the higher pressure region while the sensitivity is lowered in the lower pressure region.

According to the circuit construction of Embodiment 2, it is possible to correct a very small non-linear property which is out of the question in general cases, such as the balloon effect that the sensitivity is lowered with increase of the applied pressure, or such an effect that the sensitivity is lowered due to the voltage dependency of the diffused resistor of the IC circuit when the output voltage is high. In consequence, there may be obtained an output property of a very high precision. Hereupon, the amount of the correction described above can be adjusted by means of the D-A converters DAC1 and DAC2.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor pressure detecting device comprising:
    a sensor element section having semiconductor resistors each of which is distorted in response to a pressure to change its resistance in response to a distortion thereof, said sensor element section being supplied with a reference source voltage while outputting a voltage corresponding to said pressure;
    a voltage amplifying section for amplifying the voltage outputted from said sensor element section to output the amplified voltage as an output voltage; and
    an output voltage feedback section for feeding back the output voltage of said voltage amplifying section to the reference source voltage so as to impart a non-linear property for the pressure to the output voltage,
    wherein a voltage proportional to the reference source voltage is used as a reference voltage for said voltage amplifying section.

2. The semiconductor pressure detecting device according to claim 1, wherein a voltage obtained by adding the output voltage to a driving voltage supplied from an external section is used as a reference voltage and a reference voltage for said voltage amplifying section.

3. The semiconductor pressure detecting device according to claim 1, wherein said output voltage feedback section feeds back a difference voltage between the output voltage of said voltage amplifying section and an offset voltage of the output voltage to the reference source voltage.

4. The semiconductor pressure detecting device according to claim 3, wherein the offset voltage and the difference voltage are adjusted by a circuit common thereto.

5. The semiconductor pressure detecting device according to claim 1, a feedback ratio of the output voltage of said voltage amplifying section for the reference source voltage can be set to an arbitrary value.

6. The semiconductor pressure detecting device according to claim 1, wherein said output voltage feedback section imparts the output voltage with such a non-linear property that the higher the output voltage of said voltage amplifying section becomes, the higher the reference source voltage becomes.

7. The semiconductor pressure detecting device according to claim 1, wherein said output voltage feedback section imparts the output voltage with such a non-linear property that the higher the output voltage of said voltage amplifying section becomes, the lower the reference source voltage becomes.

* * * * *